United States Patent [19]
Kan et al.

[11] Patent Number: 5,922,812
[45] Date of Patent: Jul. 13, 1999

[54] 4-METHYL-1-PENTENE POLYMER COMPOSITION

[75] Inventors: Kojiro Kan; Akio Yamamoto, both of Kuga-gun, Japan

[73] Assignee: Mitsui Chemicals, Inc., Tokyo, Japan

[21] Appl. No.: 08/913,320

[22] PCT Filed: Feb. 20, 1996

[86] PCT No.: PCT/JP96/00378

§ 371 Date: Sep. 12, 1997

§ 102(e) Date: Sep. 12, 1997

[87] PCT Pub. No.: WO96/28507

PCT Pub. Date: Sep. 19, 1996

[30] Foreign Application Priority Data

Mar. 13, 1995 [JP] Japan ................................ 7-052727

[51] Int. Cl.⁶ ................................................ C08L 23/20
[52] U.S. Cl. ..................... 525/240; 428/35.2; 428/36.9; 428/220
[58] Field of Search ........................... 525/240; 428/35.2, 428/36.9, 220

[56] References Cited

U.S. PATENT DOCUMENTS 4,546,150 10/1985 Shigemoto.
5,534,593 7/1996 Friedman .............................. 525/240

FOREIGN PATENT DOCUMENTS 60-28442  2/1985  Japan.

*Primary Examiner*—Donald R. Wilson
*Attorney, Agent, or Firm*—Sherman and Shalloway

[57] ABSTRACT

A 4-methyl-1-pentene polymer composition having excellent heat resistance, releasability, gas permeability, impact resistance and other mechanical properties as well as heat sealability, prepared by melt mixing 40 to 97.5 parts by weight of a 4-methyl-1-pentene polymer (A), 2.5 to 60 parts by weight of a 1-butene polymer (B), and 1 to 100 parts by weight, based on 100 parts by weight of the total of (A) and (B), of a propylene polymer (C).

9 Claims, No Drawings

4-METHYL-1-PENTENE POLYMER COMPOSITION

FIELD OF THE INVENTION

This invention relates to a 4-methyl-1-pentene polymer composition, and more specifically, to a 4-methyl-1-pentene polymer composition having excellent heat sealability and mechanical properties.

BACKGROUND TECHNOLOGY 4-methyl-1-pentene polymers are widely used in such applications as MWO food containers, syringes, analysis cells, experimental equipment such as beakers and flasks, base material used in preparing synthetic leathers in view of their high transparency and high melting point in the range of from 220 to 240° C. and the resulting high heat distortion temperature. The 4-methyl-1-pentene polymers, however, were sometimes insufficient in other mechanical properties such as impact resistance, and the films made therefrom had insufficient heat sealability. A widely adopted solution for improving such insufficient heat sealability is addition of a low density polyethylene, an ethylene-propylene copolymer, or other ethylene-based resins. Such addition of the ethylene-based resin to the 4-methyl-1-pentene polymers have so far resulted in little improvement in their heat sealability, and instead, resulted in poor dispersion and deteriorated impact resistance. Another means proposed for improving the heat sealability of the films made from 4-methyl-1-pentene polymers is addition to the 4-methyl-1-pentene polymers of a particular propylene-α-olefin copolymer (JP-A-60-28442).

The films prepared by blending the 4-methyl-1-pentene polymers with the particular propylene-α-olefin copolymer were still insufficient both in their heat seal strength and improvement in mechanical properties. In view of such situation, there is a strong demand for a 4-methyl-1-pentene polymer composition which has improved heat sealability and mechanical properties while retaining the characteristic features of the 4-methyl-1-pentene polymer.

SUMMARY OF THE INVENTION

In view of such situation, an object of the present invention is to provide a 4-methyl-1-pentene polymer composition wherein excellent heat resistance, releasability, gas permeability, and other properties inherent to the 4-methyl-1-pentene polymers are retained, and wherein impact resistance and other mechanical properties as well as heat sealability are improved.

To obviate such problems, the inventors of the present invention have made extensive studies in order to make use of characteristic features of the 4-methyl-1-pentene polymer and to improve the heat sealability and impact resistance. After such efforts, the inventors found that the mechanical properties and heat sealability can be markedly improved when the 4-methyl-1-pentene polymer is blended with a 1-butene polymer and a propylene polymer, and the present invention has been completed on such finding.

According to the present invention, there is provided a 4-methyl-1-pentene polymer composition prepared by melt mixing 40 to 97.5 parts by weight of a 4-methyl-1-pentene polymer (A), 2.5 to 60 parts by weight of a 1-butene polymer (B), and 1 to 100 parts by weight, based on 100 parts by weight of the total of (A) and (B), of a propylene polymer (C).

BEST MODE FOR CARRYING OUT THE INVENTION

Next, the 4-methyl-1-pentene polymer composition of the present invention (hereinafter referred to as "the composition of the present invention") is described in detail.

The 4-methyl-1-pentene polymer used as component (A) in the composition of the present invention is either a 4-methyl-1-pentene homopolymer or a random copolymer of the 4-methyl-1-pentene with another α-olefin. Exemplary such α-olefins include α-olefins containing 2 to 20 carbon atoms such as ethylene, propylene, 1-butene, 1-hexene, 1-octene, 1-decene, 1-dodecene, 1-tetradecene, 1-hexadecene, 1-octadecene, and 1-eicosene. When such an α-olefin is contained in the 4-methyl-1-pentene polymer (A), it may be contained either alone or in combination of two or more. Among such α-olefins, the preferred are 1-decene, 1-dodecene, 1-tetradecene, 1-hexadecene, 1-octadecene, and 1-eicosene. It should be noted that, in the present invention, the 4-methyl-1-pentene polymer (A) is a polymer which contains at least 80% by weight of 4-methyl-1-pentene as its main component.

The 4-methyl-1-pentene polymer (A) may preferably contain 0.1 to 20% by weight, and more preferably, 0.5 to 15% by weight of the α-olefin other than the 4-methyl-1-pentene since use of such 4-methyl-1-pentene polymer (A) results in the excellent heat resistance of the resulting composition.

The 4-methyl-1-pentene polymer (A) may preferably have a melt flow rate (MFR) measured in accordance with ASTM D1238 under the conditions of the load of 5.0 kg and the temperature of 260° C. in the range of 0.1 to 150 g/10 min, and most preferably, 1.0 to 100 g/10 min. When the 4-methyl-1-pentene polymer (A) has an MFR of at least 0.1/10 min, fluidity of the composition would be increased to allow for smooth extrusion. On the other hand, an MFR of up to 150 g/10 min would result in a composition with sufficiently improved heat sealability and impact resistance.

Component (B) of the composition of the present invention is the 1-butene polymer, which may be either a 1-butene homopolymer or a random copolymer of the 1-butene with another α-olefin. Exemplary such α-olefins include α-olefins containing 2 to 20 carbon atoms such as ethylene, propylene, 1-butene, 1-hexene, 1-octene, 1-decene, 1-tetradecene, and 1-octadecene. When such an α-olefin is contained in the 1-butene polymer (B), it may be contained either alone or in combination of two or more. Among such α-olefins, the preferred are ethylene and propylene. It should be noted that, in the present invention, the 1-butene polymer (B) is a polymer which contains at least 60% by weight of 1-butene as its main component.

The 1-butene polymer (B) may preferably contain less than 40% by weight, and more preferably, less than 25% by weight of the α-olefin other than the 1-butene in view of its compatibility with the 4-methyl-1-pentene polymer (A).

The 1-butene polymer (B) may preferably have a melt flow rate (MFR) measured in accordance with ASTM D1238 under the conditions of the load of 2.16 kg and the temperature of 190° C. in the range of 0.01 to 100 g/10 min, and most preferably, 0.1 to 50 g/10 min.

When the 1-butene polymer (B) has an MFR of at least 0.01/10 min, the resulting composition of the present invention would have an increased fluidity to enable more uniform dispersion. On the other hand, an MFR of up to 100 g/10 min would result in a composition with sufficiently improved heat sealability and impact resistance.

Component (C) of the composition of the present invention is the propylene polymer, which may be either a propylene homopolymer or a random copolymer of the propylene with another α-olefin. Exemplary such α-olefins include α-olefins containing 2 to 20 carbon atoms such as ethylene, 1-butene, 1-hexene, 1-octene, 1-decene, 1-tetradecene, and 1-octadecene. Such an α-olefin may be contained either alone or in combination of two or more. Among such α-olefins, the preferred are ethylene and 1-butene. It should be noted that, in the present invention, the propylene polymer (C) is a polymer which contains at least 60% by weight of propylene as its main component.

The propylene polymer (C) may preferably contain 0 to 40% by weight, and more preferably, 5 to 30% by weight of the α-olefin other than the propylene in order to improve the heat sealability and tensile strength and other mechanical properties of the resulting composition of the present invention.

The propylene polymer (C) may preferably have a melt flow rate (MFR) measured in accordance with ASTM D1238 under the conditions of the load of 2.16 kg and the temperature of 230° C. in the range of 0.01 to 100 g/10 min, and most preferably, 0.1 to 50 g/10 min.

When the propylene polymer (C) has an MFR of at least 0.1 g/10 min, it will be more uniformly dispersed in the 4-methyl-1-pentene polymer (A). On the other hand, an MFR of up to 100 g/10 min would result in a composition with sufficiently improved heat sealability and impact resistance.

In the composition of the present invention, the blend ratio of the 4-methyl-1-pentene polymer (A) to the 1-butene polymer (B) is in the range of 40 to 97.5 parts by weight of the 4-methyl-1-pentene polymer (A) to 60 to 2.5 parts by weight of the 1-butene polymer (B); and preferably, 50 to 80 parts by weight of the 4-methyl-1-pentene polymer (A) to 50 to 20 parts by weight of the 1-butene polymer (B). When the blend ratio is in such range, the excellent heat resistance and gas permeability of the 4-methyl-1-pentene polymer (A) will be retained in the resulting composition, and the 1-butene polymer (B) will be sufficiently dispersed in the 4-methyl-1-pentene polymer (A).

In the composition of the present invention, the amount of the propylene polymer (C) blended is in the range of 1 to 100 parts by weight, and preferably, 20 to 80 parts by weight per 100 parts by weight of the total of the 4-methyl-1-pentene polymer (A) and the 1-butene polymer (B).

The composition of the present invention may also include various additives which are generally used with polyolefins in an amount that does not adversely affect the benefits of the present invention. Exemplary such additives are silane coupling agent, whethering agent, heat stabilizer, anti-slip agent, nucleating agent, pigment, and die.

The composition of the present invention may preferably have an MFR measured in accordance with ASTM D1238 under the conditions of the load of 5.0 kg and the temperature of 260° C. in the range of 0.1 to 150 g/10 min, and more preferably, 1.0 to 100 g/10 min.

When the MFR of the composition of the present invention is at least 0.1 g/10 min, the composition of the present invention will have sufficient fluidity to facilitate desired extrusion with ease. On the other hand, the MFR of less than 150 g/10 min will result in sufficiently improved heat sealability and mechanical properties including the impact resistance.

The composition of the present invention may be produced by mixing the 4-methyl-1-pentene polymer (A), the 1-butene polymer (B), the propylene polymer (C) and the optionally added additives at a predetermined ratio by a known means, for example, by using a V-shaped blender, a ribbon blender, Henschel mixer, a tumbler blender or the like; melt kneading the mixture in a single screw extruder, a double screw extruder, a kneader, Bunbury mixer, or the like; and pelletizing or grinding the resulting mixture. The mixture may be melt kneaded under the conditions such that the composition temperature is generally in the range of from 260 to 320° C., and preferably, from 270 to 310° C.

EXAMPLES

Next, the present invention is described in further detail by referring to the Examples of the invention and Comparative Examples, which by no means limit the scope of the invention as long as the Examples are within the scope of the present invention. In the Examples and Comparative Examples, the films were measured and evaluated for their physical properties (MFR, tensile strength, heat sealability, and oxygen permeability) in the manner as described below.

(1) Evaluation of the physical properties of the films

The physical properties of the films were determined by the procedures and conditions as described below.

(i) MFR

The films were evaluated for their MFR in accordance with ASTM D1238 under the conditions of the load of 5 kg and temperature of 260° C.

(ii) Tensile properties

Test pieces were cut out of the films, and evaluated by the tensile test under the conditions as described below.

Test conditions

Test piece shape: ASTM type IV

Test speed: 200 mm/min

Distance between crossheads: 64 mm

Temperature: 23° C.

n (number of times): 5

(iii) Heat sealability

Two films were superimposed on each other and heat sealed with heat bars under the conditions as described below. The heat sealed seam was evaluated by T-peel test. The conditions of the peel test were as described below.

Heat seal conditions

| Temperature of seal bar | | |
|---|---|---|
| Upper seal bar | Lower Seal bar | Time of heat seal |
| 280° C. | 140° C. | 4 seconds |
| 285° C. | 140° C. | 4 seconds |
| 290° C. | 140° C. | 4 seconds |

Peel test conditions

Test speed: 300 mm/min

Distance between crossheads: 64 mm

Temperature: 23° C.

(number of times): 5

(iv) Measurement of oxygen permeability

Evaluation was carried out in accordance with B method of JIS K7126 using the test apparatus (OXTRAN 10/50) manufactured by MOCON.

Example 1

70 parts by weight of 4-methyl-1-pentene/1-octadecene copolymer powder (1-octadecene content: 6.0% by weight; MFR: 5.0 g/10 min) were blended with 30 parts by weight of 1-butene/ethylene random copolymer (ethylene content: 5% by weight; MFR: 1.0 g/10 min) and 40 parts by weight of propylene/1-butene random copolymer (1-butene content: 20% by weight; MFR: 5.0 g/10 min), and stabilizers of 0.10 parts by weight of 2-[1-(2-hydroxy-3,5-di-tertpentylphenyl)ethyl]-4,6-di-tert-pentylphenyl acrylate (manufactured by Sumitomo Chemical K. K.; commercial trade name: Sumilizer-GS); 0.10 parts by weight of tetrakis [methylene-3(3,5-di-tert-butyl-4-hydroxyphenyl)-propionate]methane (manufactured by Ciba-Geigy K. K., commercial trade name: Irganox 1010); 0.10 parts by weight of penta(erythritol-tetra-β-mercaptolauryl)propionate (manufactured by Shipro Kasei K. K., commercial trade name: SEENOX 412S); and 0.03 parts by weight of calcium stearate (manufactured by Sankyo Yuki-Gosei K. K., commercial name: calcium stearate), and the mixture was blended in Henschel mixer at high speed for 1 minute. The resulting mixture was melt kneaded in a twin screw extruder (set temperature: 280° C., diam.: 65 mm) at 280° C. to obtain a composition. The composition was extruded from a T-die (set temperature: 280° C.), cooled by shaping rolls at 60° C. to prepare a film of 250 μm thick. The film was evaluated for its MFR and heat sealability. The results are shown in Table 1.

Example 2

50 parts by weight of 4-methyl-1-pentene/1-octadecene copolymer powder (1-octadecene content: 6.0% by weight; MFR: 5.0 g/10 min) were blended with 50 parts by weight of 1-butene/ethylene random copolymer (ethylene content: 5% by weight; MFR: 1.0 g/10 min) and 75 parts by weight of propylene/1-butene random copolymer (1-butene content: 20% by weight; MFR: 5.0 g/10 min), and stabilizers of 0.10 parts by weight of 2-[1-(2-hydroxy-3,5-di-tert-pentylphenyl)ethyl]-4,6-di-tert-pentylphenyl acrylate (manufactured by Sumitomo Chemical K. K.; commercial trade name: Sumilizer-GS); 0.10 parts by weight of tetrakis [methylene-3(3,5-di-tert-butyl-4-hydroxyphenyl)-propionate]methane (manufactured by Ciba-Geigy K. K., commercial trade name: Irganox 1010); 0.10 parts by weight of penta(erythritol-tetra-β-mercaptolauryl)propionate (manufactured by Shipro Kasei K. K., commercial trade name: SEENOX 412S); and 0.03 parts by weight of calcium stearate (manufactured by Sankyo Yuki-Gosei K. K., commercial name: calcium stearate), and the mixture was blended in Henschel mixer at high speed for 1 minute. The procedure of Example 1 was repeated to produce a composition from the resulting mixture and to prepare a film of 250 μm thick from the composition. The film was evaluated for its MFR and heat sealability. The results are shown in Table 1.

Example 3

60 parts by weight of 4-methyl-1-pentene/1-octadecene copolymer powder (1-octadecene content: 6.0% by weight; MFR: 5.0 g/10 min) were blended with 20 parts by weight of 1-butene/ethylene random copolymer (ethylene content: 5% by weight; MFR: 1.0 g/10 min) and 40 parts by weight of propylene/ethylene random copolymer (ethylene content: 5% by weight; MFR: 1.0 g/10 min), and stabilizers of 0.10 parts by weight of 2-[1-(2-hydroxy-3,5-di-tert-pentylphenyl)ethyl]-4,6-di-tert-pentylphenyl acrylate (manufactured by Sumitomo Chemical K. K.; commercial trade name: Sumilizer-GS); 0.10 parts by weight of tetrakis [methylene-3(3,5-di-tert-butyl-4-hydroxyphenyl) propionate]methane (manufactured by Ciba-Geigy K. K., commercial trade name: Irganox 1010); 0.10 parts by weight of penta(erythritol-tetra-β-mercaptolauryl)propionate (manufactured by Shipro Kasei K. K., commercial trade name: SEENOX 412S); and 0.03 parts by weight of calcium stearate (manufactured by Sankyo Yuki-Gosei K. K., commercial name: calcium stearate), and the mixture was blended in Henschel mixer at high speed for 1 minute. The procedure of Example 1 was repeated to produce a composition from the resulting mixture and to prepare a film of 250 μm thick from the composition. The film was evaluated for its MFR and heat sealability. The results are shown in Table 1.

Example 4

60 parts by weight of 4-methyl-1-pentene/1-octadecene copolymer powder (1-octadecene content: 6.0% by weight; MFR: 5.0 g/10 min) were blended with 40 parts by weight of 1-butene/ethylene random copolymer (ethylene content: 5% by weight; MFR: 1.0 g/10 min) and 10 parts by weight of propylene/ethylene random copolymer (ethylene content: 30% by weight; MFR: 2.0 g/10 min), and stabilizers of 0.10 parts by weight of 2-[1-(2-hydroxy-3,5-di-tert-pentylphenyl)ethyl]-4,6-di-tert-pentylphenyl acrylate (manufactured by Sumitomo Chemical K. K.; commercial trade name: Sumilizer-GS); 0.10 parts by weight of tetrakis [methylene-3(3,5-di-tert-butyl-4-hydroxyphenyl)-propionate]methane (manufactured by Ciba-Geigy K. K., commercial trade name: Irganox 1010); 0.10 parts by weight of penta(erythritol-tetra-β-mercaptolauryl)propionate (manufactured by Shipro Kasei K. K., commercial trade name: SEENOX 412S); and 0.03 parts by weight of calcium stearate (manufactured by Sankyo Yuki-Gosei K. K., commercial name: calcium stearate), and the mixture was blended in Henschel mixer at high speed for 1 minute. The resulting mixture was melt kneaded in a twin screw extruder (set temperature: 280° C., diam.: 65 mm) at 280° C. to obtain a composition. The composition was extruded from a T-die (set temperature: 280° C.), cooled by shaping rolls at 60° C. to prepare a film of 250 μm thick. The film was evaluated for its MFR and heat sealability. The results are shown in Table 1.

Comparative Example 1

100 parts by weight of 4-methyl-1-pentene/1-octadecene copolymer powder (1-octadecene content: 6.0% by weight; MFR: 5.0 g/10 min) were blended with stabilizers of 0.10 parts by weight of 2-[1-(2-hydroxy-3, 5-di-tert-pentylphenyl) ethyl]-4,6-di-tert-pentylphenyl acrylate (manufactured by Sumitomo Chemical K. K.; commercial trade name: Sumilizer-GS); 0.10 parts by weight of tetrakis [methylene-3(3,5-di-tert-butyl-4-hydroxyphenyl) propionate]methane (manufactured by Ciba-Geigy K. K., commercial trade name: Irganox 1010); 0.10 parts by weight of penta (erythritol-tetra-β-mercaptolauryl)propionate (manufactured by Shipro Kasei K. K., commercial trade name: SEENOX 412S); and 0.03 parts by weight of calcium stearate (manufactured by Sankyo Yuki-Gosei K. K., commercial name: calcium stearate), and the mixture was blended in Henschel mixer at high speed for 1 minute. The procedure of Example 1 was repeated to produce a composition from the resulting mixture and to prepare a film of 250 μm thick from the composition. The film was evaluated for its MFR and heat sealability. The results are shown in Table 1.

TABLE 1

| | Film MFR, g/10 min | Tensile properties (MD/TD) | | | | Oxygen permeability | Heat seal strength (kg/15 mm) Temp. of seal bar | | |
| --- | --- | --- | --- | --- | --- | --- | --- | --- | --- |
| | | Yield Stress | Strength at break | Initial modulus | Elongation at break | | 280° C. | 285° C. | 290° C. |
| Ex. 1 | 30 | 140/130 | 380/370 | 5500/5300 | 450/550 | 2500 | 4.0 | 5.0 | 4.6 |
| Ex. 2 | 40 | 130/120 | 470/420 | 4000/4000 | 550/650 | 1200 | 6.1 | 6.2 | 5.5 |
| Ex. 3 | 35 | 150/140 | 420/400 | 6000/5500 | 400/450 | 2000 | 3.6 | 4.4 | 4.1 |
| Ex. 4 | 30 | 120/110 | 350/310 | 5400/4400 | 380/400 | 3200 | 3.5 | 4.2 | 3.8 |
| Comp. Ex. 1 | 30 | 210/200 | 310/300 | 9000/9000 | 250/350 | 8400 | 2.3 | 2.5 | 2.1 |

Note:
unit of yield stress, strength at break, and initial modulus: kg/cm$^2$.
unit of elongation at break: %.
unit of oxygen permeability: cc/m$^2$ · 24 hr · atm

INDUSTRIAL UTILITY

The 4-methyl-1-pentene polymer composition of the present invention has excellent mechanical properties including heat resistance, heat sealability, and impact resistance as well as satisfactory gas permeability. Therefore, the composition of the present invention would be an appropriate material for producing various structural materials by injection molding. The composition of the present invention may also be extruded into films and laminate papers having the above-mentioned excellent properties. The thus produced films have excellent mechanical properties including impact resistance and tensile strength as well as satisfactory releasability and gas permeability. The films are also heat sealable and the heat sealed film has sufficient strength. Therefore, such films are quite appropriate for use as vegetable wrapping films, industrial films, and bags for storing platelets and cells. In addition to such films, the composition of the invention is preferable for use in the production of tablewares and structural materials by injection molding or the like.

We claim:

1. A 4-methyl-1-pentene polymer composition prepared by melt mixing 40 to 97.5 parts by weight of a 4-methyl-1-pentene polymer (A), 2.5 to 60 parts by weight of a 1-butene polymer (B), and 1 to 100 parts by weight, based on 100 parts by weight of the total of (A) and (B), of a propylene polymer (C) wherein said polymer (A) has a 4-methyl-1-pentene content of at least 80% by weight, said polymer (B) has a 1-butene content of at least 60% by weight, and said polymer (C) has a propylene content of at least 60% by weight.

2. The 4-methyl-1-pentene polymer composition according to claim 1 wherein said 4-methyl-1-pentene polymer (A) is a random copolymer of ethylene or an α-olefin having 3 to 20 carbon atoms and 4-methyl-1-pentene.

3. The 4-methyl-1-pentene polymer composition according to claim 1 wherein said 4-methyl-1-pentene polymer (A) is a random copolymer of at least one member selected from 1-decene, 1-dodecene, 1-tetradecene, 1-hexadecene, and 1-octadecene; with 4-methyl-1-pentene.

4. The 4-methyl-1-pentene polymer composition according to claim 1 wherein said 1-butene polymer (B) is a random ethylene or an α-olefin having 2 to 20 carbon atoms and 1-butene.

5. The 4-methyl-1-pentene polymer composition according to claim 1 wherein said 1-butene polymer (B) is a random copolymer of ethylene and/or propylene with 1-butene.

6. The 4-methyl-1-pentene polymer composition according to claim 1 wherein said propylene polymer (C) is a random copolymer of ethylene or an α-olefin having 4 to 20 carbon atoms and propylene.

7. The 4-methyl-1-pentene polymer composition according to claim 1 wherein said propylene polymer (C) is a random copolymer of propylene with ethylene and/or butene-1.

8. A film prepared from the 4-methyl-1-pentene polymer composition of claim 1.

9. A container for platelet or cell storage prepared from the 4-methyl-1-pentene polymer composition of claim 1.

* * * * *